United States Patent [19]

Kuo

[11] Patent Number: 6,022,403
[45] Date of Patent: Feb. 8, 2000

[54] PIGMENTED INKS AND DISPERSANTS USED THEREWITH

[75] Inventor: Richard J. Kuo, St. Paul, Minn.

[73] Assignee: 3M Innovative Properties Company, St. Paul, Minn.

[21] Appl. No.: 09/036,057

[22] Filed: Mar. 6, 1998

Related U.S. Application Data

[63] Continuation of application No. 08/757,897, Nov. 27, 1996, Pat. No. 5,725,647.

[51] Int. Cl.$^7$ .................................................. C09D 11/02
[52] U.S. Cl. ..................................... 106/31.86; 106/31.87; 106/31.89
[58] Field of Search ............................... 106/31.6, 31.85, 106/81.86, 31.87, 31.89, 31.9; 101/491; 347/100

[56] References Cited

U.S. PATENT DOCUMENTS

| | | | |
|---|---|---|---|
| 3,993,492 | 11/1976 | Woolly | 106/31.09 |
| 4,170,482 | 10/1979 | Mansukhani | 106/31.58 |
| 4,210,916 | 7/1980 | Mansukhani | 346/1.1 |
| 4,279,653 | 7/1981 | Makishima et al. | 106/31.32 |
| 4,308,061 | 12/1981 | Iwahashi | 106/31.43 |
| 4,421,559 | 12/1983 | Owatari | 106/31.43 |
| 4,500,355 | 2/1985 | Shimada | 106/31.5 |
| 4,597,794 | 7/1986 | Ohta | 347/100 |
| 4,750,937 | 6/1988 | Botros | 106/31.27 |
| 4,923,515 | 5/1990 | Koike et al. | 106/31.58 |
| 4,959,661 | 9/1990 | Buxton et al. | 346/1.1 |
| 4,986,850 | 1/1991 | Iwata et al. | 106/31.36 |
| 5,017,227 | 5/1991 | Koike | 106/31.51 |
| 5,085,698 | 2/1992 | Ma et al. | 524/388 |
| 5,106,417 | 4/1992 | Hauser et al. | 106/476 |
| 5,122,187 | 6/1992 | Schwarz et al. | 106/31.29 |
| 5,125,968 | 6/1992 | Takimoto et al. | 106/31.75 |
| 5,169,437 | 12/1992 | You | 106/31.58 |
| 5,180,425 | 1/1993 | Matrick et al. | 106/31.58 |
| 5,183,502 | 2/1993 | Meichsner et al. | 106/31.58 |
| 5,198,504 | 3/1993 | Wypart et al. | 525/301 |
| 5,221,333 | 6/1993 | Shirota et al. | 106/31.58 |
| 5,242,489 | 9/1993 | Schwarz, Jr. | 106/31.49 |
| 5,254,159 | 10/1993 | Gundlach et al. | 106/31.43 |
| 5,356,464 | 10/1994 | Hickman et al. | 106/31.36 |
| 5,389,133 | 2/1995 | Gundlach et al. | 106/31.43 |
| 5,519,085 | 5/1996 | Ma et al. | 524/503 |
| 5,536,306 | 7/1996 | Johnson et al. | 106/31.49 |
| 5,542,969 | 8/1996 | Hirasa et al. | 106/31.87 |
| 5,551,973 | 9/1996 | Oliver et al. | 106/31.25 |
| 5,554,213 | 9/1996 | Radigan et al. | 106/31.43 |
| 5,593,807 | 1/1997 | Sacripante et al. | 430/137 |
| 5,679,724 | 10/1997 | Sacripante et al. | 523/161 |
| 5,725,647 | 3/1998 | Carlson et al. | 106/31.86 |

FOREIGN PATENT DOCUMENTS 0 712 912 A2  5/1996  European Pat. Off. ........ C09D 11/00

OTHER PUBLICATIONS

Derwent Abstract of JP AN–71–00682s and JP 45 041 041 B (1967).

*Primary Examiner*—Helene Klemanski
*Attorney, Agent, or Firm*—Dale A. Bjorkman

[57] ABSTRACT

Pigmented inks are disclosed comprising an aqueous medium, a pigment, a dispersant, and a humectant. Inks are disclosed where the humectant is a sulfonated polyethylene oxide which provides long decap times and fast drying of the printed image. Inks are further disclosed where the dispersant is an alkyl(sulfophenoxy)benzenesulfonic acid or its salt. Such dispersants reduce the agglomeration of pigment particles and reduce or eliminate the deposition of foreign substances on heater elements during the jetting process. A variety of pigments, dispersants, humectants, and aqueous media can be used. Combinations of a sulfonated polyethylene oxide humectant and an alkyl(sulfophenoxy) benzenesulfonic acid (salt) dispersant provide inks with good stability, few kogation problems, long decap times and relatively fast drying times.

3 Claims, No Drawings

PIGMENTED INKS AND DISPERSANTS USED THEREWITH

This is a continuation of application Ser. No. 08/757,897 filed Nov. 27, 1996 now U.S. Pat. No. 5,725,647.

FIELD OF INVENTION

The present invention relates to water-based pigmented inks, and in particular, such inks adapted for use with ink jet printing applications.

BACKGROUND OF INVENTION

In recent years, the use of ink jet printers in numerous applications has increased dramatically. Such printers make use of liquid-based inks which are jetted onto a receptor, typically a sheet of paper or film, to produce an image. By using four basic ink colors (cyan, magenta, yellow, and black) in various combinations and concentrations, virtually any color may be produced as part of the printed image. Additionally, ink jet technology is well-suited for high resolution graphic images, particularly those produced using electronic printing systems. Such systems typically employ computer technology to create, modify, and store images, text, graphics and the like.

Many of the inks that have been used in the past with irik jet and other printers are primarily comprised of dyes contained within organic- or water-based carrier liquids. Although such inks may offer satisfactory performance in certain applications, the present trend is away from such systems, since such systems tend to produce images that lack the light stability and durability required for outdoor and similarly demanding applications.

In order to solve this problem, inks prepared by using pigments, instead of dyes, as colorants have been investigated.

Pigmented inks for ink jet applications have to meet several stringent requirements. For example, particle size has to be very small and particle size distribution has to be narrow in order to avoid pigment settling and nozzle plugging. The dispersion has to have good stability against agglomeration in order to avoid nozzle plugging and to have good shelf life. The ink has to have good thermal stability, particularly for application in thermal ink jet printers, in order to avoid "kogation".

Pigment dispersions are thermodynamically unstable. The suspended pigment particles tend to agglomerate due to attractive van der Waals forces. Since ink jet printers make use of very small jet nozzles (on the order of less than about 80 micrometers) to provide high resolution images, the resulting pigment agglomeration has a tendency to plug the printer heads. Additionally, in the case of thermal ink jet systems, such inks also suffer from the tendency of materials to settle onto, and coat, the heating elements inside the nozzles of the printer head. This causes a reduced thermal efficiency of the print head which results in the formation of smaller ink droplets, lower drop velocity, and lower image quality. This effect is commonly referred to as "kogation".

To overcome the problems described above, dispersants are typically employed to adsorb onto pigment surface to build a protective layer, (either electrostatically or sterically or a combination of both,) around each particle to counteract the attractive forces.

In one approach, as disclosed in U.S. Pat. Nos. 5,125,968 and 4,959,661, the dispersants are selected from surfactants which contain a hydrophilic portion as well as a hydrophobic portion.

In another approach, polymers having hydrophilic segments and hydrophobic segments have been used. Polymer dispersants having both random and block structures have been disclosed. Examples of these approaches are described in U.S. Pat. No. 4,597,794 and U.S. Pat. No. 5,085,698.

Other attempts involving the use of polymeric dispersants have been made as well. For example, water-soluble polymers such as styrene-acrylic acid copolymers have also been considered, yet these have yielded only partial success. In particular, such systems, although promising, have tended to produce non-uniform printed solid block images. The lack of uniformity in the printed image, which becomes more pronounced with prolonged printing, is caused by incomplete coverage of the receptor surface in the image area.

This problem, commonly referred to as "banding" results from progressively smaller projected ink drops over the course of a printing job. This effect is believed to be a result of kogation, caused by deposition of thermal insulating materials on the heating elements within the printing cartridge. As a result, heat transfer efficiency into the ink is decreased, thereby reducing the ability to produce properly sized ink bubbles needed for the printing process. Even if the deposited material is thermally conductive, it may still change the nucleation behavior on the heater surface during heating which also may adversely affect the bubble formation. Another problem which is often observed to be associated with polymeric dispersants is that the ink tends to solidify at a nozzle tip to cause obstruction.

Another critical requirement for a pigmented ink jet ink is long decap time so that crusting of the ink composition does not occur on the nozzle plate either during printing or when the printer is in the idle mode.

"Decap time" is defined as the length of time over which an ink remains fluid in the nozzle openings when exposed to air so that ink drops can be fired at their intended targets. Crusting of the nozzle plate will result in poor print quality or even worse may completely plug nozzles thereby causing total print failure. Humectants may be added to promote long decap times, but they must be carefully selected to neither cause flocculation of the pigmented ink dispersions nor promote kogation.

A third important property for pigmented inks is the ability to dry fast once ink drops are placed on the receptor to produce the intended image. Fast drying is important because it is one of the key factors that determines the printer productivity.

The requirement of long decap time and the requirement of fast printed image drying are often in conflict. For example, in order to overcome the crusting problem and improve decap time, a significant amount of a high boiling cosolvent such as ethylene glycol or diethylene glycol is normally employed in the ink composition to reduce the rate of evaporation. However, since these types of cosolvents tend to dramatically reduce the drying rate of the printed image that diminishes the requirement of fast printed image drying.

SUMMARY OF INVENTION

In view of the foregoing, a need exists for water-based pigmented inks for ink jet applications that show (1) reduced agglomeration or flocculation of pigment particles, (2) reduced deposition of foreign substances on heater elements during the jetting process, (3) long "decap times" and no crusting on the ink jet printer nozzle plate for an acceptable period of time, and (4) fast drying of the printed image.

A need also exists for inks which offer stability in both short- and long-term regimes.

The present invention solves these problems in the art by providing an ink, comprising:

(a) an aqueous medium, (b) a pigment, (c) a dispersant, and (d) a humectant selected from the group consisting of compounds of the following formula (I):

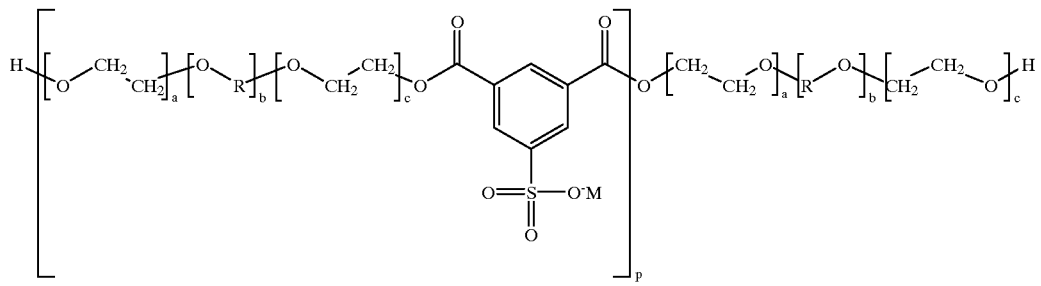

Formula (I)

where "M" is a cation, p ranges from about 1 to about 10, and wherein the sum (a+c) ranges from about 2 to about 50, b ranges from 0 to about 20, and R is an alkyl, aryl, or aralkyl group of less than about 10 carbons. R can also be a polyether of molecular weight below about 1000, such as a polypropylene oxide or a polytetramethylene oxide. A preferred material has the following characteristics: M is sodium ion, p is 1, (a+c)=14, and b=0.

These humectants help promote a long "decap time" for the ink to overcome the problems enumerated above.

The inks of the present invention can comprise any pigment or combination of pigments. In particular, the inventive inks may be provided with black, cyan, yellow, and magenta pigments. By varying the individual color densities and overlying monochrome images, it is possible to provide virtually any color on an appropriate substrate. When combined with electronic graphic image systems, virtually any image that can be created or stored electronically can be reproduced using an ink jet printer. Of course, it should be understood that the present invention is not intended to be limited to inks of the four colors discussed above. Rather, inks employing any pigment that is compatible with electronic graphic image systems may be used herein.

The inks of the present invention can comprise any dispersants or combinations of dispersants. The dispersant can comprise any of the types of dispersants discussed in the Background of the Invention, namely, surfactants which contain a hydrophilic portion as well as a hydrophobic portion; polymers having hydrophilic segments and hydrophobic segments; or combinations thereof Another aspect of the invention is the use of sulfonated polyethylene oxides typified by compositions of Formula (I) as humectants in inks. Nonlimiting examples of inks include thermal pigmented inkjet inks, piezo inkjet pigmented inks, bubble jet pigmented inks, marker inks, fine point roller ball pens, plotter pen inks, fountain pen inks, and the like.

"Polyethylene oxide" means a polyoxyethylene homopolymer or copolymer which are generally prepared by the polymerization of ethylene oxide. Polyethylene oxides have the structure: $H-(OCH_2CH_2)_n-OH$ where n is an integer greater than one. Lower molecular weight hydroxyl terminated polyethylene oxide polymers are often called "polyethylene glycols" and are sold under a variety of tradenames such as "Carbowax", available from Union Carbide. Polyethylene oxide copolymers are obtained when diols are used to initiate the polymerization of ethylene oxide giving materials of Formula III, described below. Examples are propylene glycol, butanediol, pentanediol, hexanediol and low molecular weight polymeric diols such as polypropylene oxide.

Sulfonated polyethylene oxides have not been previously used as humectants in inkjet inks. Polyethylene glycol has been reported in thermal inkjet formulations, but only low molecular weight polyethylene glycols are generally useful. This is in part because of a strong tendency for higher molecular weight polyethylene glycols to crystallize upon drying, with deleterious effects on printed images. But low molecular weight polyethylene glycols are low viscosity liquids which never dry and can give a tacky inkjet image.

Moreover, such polyethylene glycols can cause dispersion instability, especially with elevated temperature. This is thought to be because polyethylene glycol becomes less water soluble as temperature increases. The polyethylene glycol may then adsorb onto a hydrophobic surface such as that of typical pigments. This can effectively flocculate a pigment dispersion. When a sulfonate group is present in a suitable quantity, water solubility is high and it is relatively unaffected by elevated temperatures.

Sulfonated polyethylene oxides of molecular weights described in Formula (I) give a clear, non-tacky image, do not crystallize or phase out of printed images, provide good inkjet cartridge "decap time", and do not interfere with dispersion stability of dispersions in the ink.

The humectants of Formula (I) are to be distinguished from:

(1) the use of polyethylene oxides derived from polyhydric alcohols (such as glycerol) as disclosed in U.S. Pat. Nos. 4,923,515 (Koike et.al ) and 5,180,425 (Matrick et.al.) that presumably do not crystallize as readily and are said to decrease clogging and reduce image non-uniformity;

(2) the use of alkyl or aryl terminated polyethylene oxide surfactants in dye-based inkjet inks as disclosed in U.S. Pat. No. 4,986,850 (Iwata et.al); and (3) the use of polyethylene oxide alkyl or alkylphenyl ether surfactants terminated by carboxylic or phosphoric acid groups and having an HLB (hydrophilic/ lipophilic balance) of more than 10 disclosed in European Patent Publication 0 712 912 A2, which are said to increase dispersion stability and drop uniformity in ink formulations. None of these preceding materials has sulfonate functionality. Sulfonated polyethylene oxides of the present invention are terminated with hydroxyl groups, not alkyl or aryl groups, and they contain centrally located sulfonate groups.

Another aspect of the present invention is an inkjet ink, comprising: (a) an aqueous medium, (b) a pigment, (c) a dispersant, and (d) a humectant; wherein the dispersant is an alkyl(sulfophenoxy)benzenesulfonic acid or salt of formula (II):

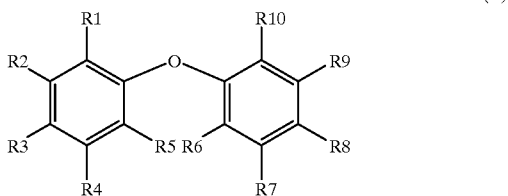

Formula (II)

wherein one member of the group R1, R2, R3, R4, and R5 is either a sulfonic acid group or its salt (—$SO_3^-$M where M is selected from the group of hydrogen ion, alkali metal ions and ammonium salts $NR_4^+$ where R is H, alkyl, aralkyl, or aryl); wherein one member of the group R6, R7, R8, R9, and R10 is either a sulfonic acid group or its salt (—$SO_3^-$M where M is selected from the group of hydrogen ion, alkali metal ions and ammonium salts $NR_4^+$ where R is H, alkyl, aralkyl, or aryl); wherein one or more members of the group R1, R2, R3, R4, R5, R6, R7, R8, R9, and R10 is an alkyl group having from about 4 to about 20 carbon atoms; and wherein the remaining members of the group R1, R2, R3, R4, R5, R6, R7, R8, R9 and R10 are hydrogen atoms.

Another aspect of the present invention is the combination of a pigmented ink of the present invention and an inkjet cartridge as an inkjet delivery system.

One feature of the present invention is ease by which the inkjet inks can be formulated for use.

An advantage of the present invention is that an alkyl (sulfophenoxy)benzenesulfonic acid dispersant or a salt thereof reduces the agglomeration or flocculation of pigment particles which reduces the deposition of foreign substances on heater elements during the jetting process.

Another advantage of the present invention is that sulfonated polyethylene oxide humectants do not cause the agglomeration or flocculation of pigment particles.

Another advantage of the present invention is that sulfonated polyethylene oxide humectants reduce or eliminate crusting on the ink jet printer nozzle plate for an acceptable period of time, thereby providing long decap times.

Another advantage of the present invention is that a sulfonated polyethylene oxide humectant provides fast drying of the printed image.

Another advantage of the present invention is that the combination of an alkyl(sulfophenoxy)benzenesulfonic acid dispersant or a salt thereof with a sulfonated polyethylene oxide humectant imparts an exceptional degree of thermal stability and "decap time" to pigmented inkjet ink formulations.

Another advantage of the present invention is an inkjet ink that offers stability in both short- and long-term regimes.

Other features and advantages will be described in conjunction with embodiments of the invention.

EMBODIMENTS OF INVENTION

Each of the elements of the pigmented inkjet ink of the present invention can be varied according to the needs of those skilled in the art within the following parameters.

Pigment:

One important consideration in formulating a set of colored inks for printing color images is the compatibility of the inks with one another. This is important since the inks will be mixed together, or at the very least, contacted with one another, during the printing process when secondary colors are to be generated. When incompatible inks are mixed together, they can coalesce and present a mottled, non-uniform surface, particularly in solid fill areas. The possibility of coalescence and mottling greatly reduces the quality of the resulting printed image. As such, when used in a multi-color printing process (such as four-color process) it is desirable to formulate each of the various colored inks using compatible, or preferably identical, formulations. Of course, in each of the formulations, the pigment will differ. Unfortunately, however, since the different pigments tend to have different surface properties, it is often very difficult to form inks in which stable pigment suspension liquids can be formulated using the same dispersant. That notwithstanding, the dispersants described below have been found to be compatible with at least one pigment in each of the four primary printing colors.

For black inks, carbon black can be used as the black pigment. The selection of carbon blacks suitable for use with the present invention is based primarily upon considerations of surface oxidation (high "volatiles" preferred), and the degree of blackness (also called jetness) of the pigment. Pigments having a high surface oxide content are more hydrophilic, and thereby much easier to disperse. Pigments with a high degree of blackness or jetness provide a high quality printed image.

Nonlimiting examples of black pigments include carbon black, such as Special Black 4, Special Black 5, Special Black 6, Special Black 4A, Color Black FW 200, and Color Black FW2 pigments (all manufactured by Degussa Corporation of Ridgefield, N.J.); Raven 1200 carbon black, Raven 1170 carbon black, Raven 3500 carbon black, and Raven 5750 carbon black pigments (all available from Columbian Chemical Corp. of Atlanta, Ga.); Mogul L carbon black and Sterling NS carbon black pigments (both available from Cabot Corp. of Boston, Mass.); and Carbon Black MA-100 pigment (available from Mitsubishi Kasei Corp. of Tokyo, Japan).

Nonlimiting examples of yellow pigments include Fanchon Fast Y-5700 PY 139 and Fanchon Fast Yellow Y-5688 C.I. Pigment Yellow 150 pigments (available from Bayer Corp. of Rock Hill, S.C.); Sunbrite Yellow 14 presscake and Spectra Pac Yellow 83 pigments (both available from Sun Chemical Corp. of Cincinnati, Ohio); Sandorin Yellow 6GL (available from Clariant Corp. of Charlotte, N.C.); and Irgazin Yellow 2RLT PY 110, Irgazin Yellow 2GLTN PY 109, Irgazin Yellow 2GLTE PY 109, and Irgazin Yellow 3RLTN PY 110 pigments (all available from Ciba Geigy). A primary consideration for selecting yellow pigment is lightfastness, since it is very desirable to produce graphic images that are adapted to outdoor applications. Another consideration is the shade of the pigment. It is generally preferred to have a green shade yellow pigment in this kind of applications. Of all the examples listed above, Fanchon Fast Yellow Y-5688 C.I. Pigment Yellow 150 and Sandorin Yellow 6GL are most preferred because they meet the two considerations.

For magenta inks, lightfastness is also the primary consideration. Quinacridone magenta pigment is known to have excellent lightfastness, and therefore, is one preferred magenta pigment. Nonlimiting examples of magenta pigments include Quindo Magenta RV-6828 Pigment Red 122, Quindo Magenta RV-6831 Pigment Red 122 presscake, Quindo Red R-6713 PV 19, and Quindo Magenta RV-6843 Pigment Red 202 pigments (all available from Bayer Corp.); and Sunfast Magenta 122 and fast Magenta 202 pigments (both available from Sun Chemical Corp.).

For cyan inks, the considerations above, (i.e., lightfastness, durability, etc.), apply as well. As a variety of satisfactory properties may be found using copper phthalocyanine as a cyan pigment, inks comprising such pigments are one preferred embodiment. Nonlimiting examples of cyan pigments include Palomar Blue B-4810 PB 15:3, Palomar Blue B-4710 PB 15:1, and Palomar Blue B-4900 pigments (all available from Bayer Corp.); and Sunfast Blue 15:3 presscake and Sunfast Blue 15:3 powder (available from Sun Chemical Corp.)

Dispersant:

The inks of the present invention can contain a dispersant selected from the group consisting of:

(1) surfactants which contain an ionic or nonionic hydrophilic portion as well as a hydrophobic portion;

(2) polymers having hydrophilic segments and hydrophobic segments; or (3) combinations thereof.

Nonlimiting examples of surfactants include U.S. Pat. Nos. 5,125,968 and 4,959,661 disclosed in the Background of the Invention above, surfactants disclosed in and incorporated by reference from U.S. patent application Ser. No. 08/558,003 (Rao et al.), disclosed in and incorporated by reference from U.S. patent application Ser. No. 08/608,921 (Kuo et al.), fluorochemical surfactants (such as 3M Fluorad™ FC-120 and FC-129 fluorochemicals from Minnesota Mining and Manufacturing Company of St. Paul, Minn.), ethoxylated alkylphenols (such as Union Carbide Triton™ M X-100, Triton X-165, Triton X-305, Tergitol™ NP-8, Tergitol NP-9, Tergitol NP-10 from Union Carbide Corporation of Danbury, Conn.), and alkyl(sulfophenoxy) benzenesulfonic acids and their salts of the following formula (II):

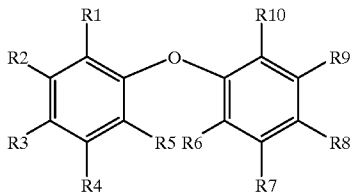

Formula (II)

wherein one member of the group R1, R2, R3, R4, and R5 is either a sulfonic acid group or its salt ($SO_3^-M$ where M is selected from the group of hydrogen, alkali metal ions and ammonium salts $NR_4^+$ where R is H, alkyl, aralkyl, or aryl);

wherein one member of the group R6, R7, R8, R9, and R10 is either a sulfonic acid group or its salt ($SO_3^-M$ where M is selected from the group of hydrogen ion, alkali metal ions and ammonium salts $NR_4^+$ where R is H, alkyl, aralkyl, or aryl);

wherein one or more members of the group R1, R2, R3, R4, R5, R6, R7, R8, R9, and R10 is an alkyl group having from about 4 to about 20 carbon atoms; and wherein the remaining members of the group R1, R2, R3, R4, R5, R6, R7, R8, R9 and R10 are hydrogen atoms.

Preferably M is sodium ion and one or two of the group R1, R2, R3, R4, R5, R6, R7, R8, R9 and R10 is an alkyl group. The dispersant may also be a mixture of two or more alkyl(sulfophenoxy)benzenesulfonic acids or their salts.

Surfactants of Formula (II) are commercially available from a number of sources. Nonlimiting examples of commercial branded surfactants include (1) Dowfax C6L (Dow Chemical Co. Midland, Mich.), a mixture comprising the disodiuni salt of hexyl (sulfophenoxy)benzenesulfonic acid;

(2) Calfax 10L-45 (Pilot Chemical Co., Santa-Fe Springs, Calif.); Dowfax C10L, Dowfax 3B2, and Dowfax 3B2-D (Dow Chemical Co.); Poly-Tergent 3B2 (Olin Corp., Norwalk, Conn.), mixtures comprising the disodium salt of decyl(sulfopilenoxy)benzenestilfoiiic acid;

(3) Calfax 10LA-75 (Pilot Chemical Co.), Dowfax 3BO (Dow Chemical Co.), Poly-Tergent 3B2 Acid (Olin Corp.) mixtures comprising decyl(sulfophenoxy) benzenesulfonic acid;

(4) Calfax DB-45 and Calfax DBA-40 (Pilot Chemical Co.); Dowfax 2AI, Dowfax 2A1-D, and Dowfax 2EP (Dow Chemical Co.); Poly-Tergent 2A1 and Poly-Tergent 2EP (Olin Corp.); Eleminol MON-7 (Sanyo Chemical Industries, Ltd., Kyoto, Japan) mixtures comprising the disodium salt of dodecyl(sulfophenoxy) benzenesulfonic acid;

(5) Calfax DBA-70 (Pilot Chemical Co.), Dowfax 2AO (Dow Chemical Co.), Poly-Tergent 2A1 Acid (Olin Corp.) mixtures comprising dodecyl(sulfophenoxy) benzenesulfonic acid;

(6) Calfax 16L-35 (Pilot Chemical Co.), Dowfax 8390 and Dowfax 8390-D (Dow Chemical Co.), Poly-Tergent 4C3 (Olin Corp.) mixtures comprising the disodium salt of hexadecyl(sulfophenoxy) benzenesulfonic acid; and (7) Poly-Tergent 4C3 is a mixture comprising the disodium salt of bis(hexadecyl)-(sulfophenoxy) benzenesulfonic acid and the disodium salt of hexadecyl(sulfophenoxy)benzenesulfonic acid.

Each of these dispersant types (1)–(7) contains an alkyl hydrophobic segment for strong adhesion to a pigment surface which is hydrophobic in nature. Additionally, since the dispersant has a hydrophilic portion which contains two anionic sulfonate functional groups per molecule, the pigment particles become effectively highly negatively charged.

While not limited to a particular theory, use of these dispersant types (1)–(7) is believed to minimize particle flocculation even at the high temperatures involved in the thermal ink jet printing process due to exceedingly strong repulsive forces between the particles. As discussed above, reduction of particle flocculation is desired because of the high thermal energy generated during jetting, which causes frequent and energetic particle interactions. Reduction of particle flocculation is further desired because it results in inks having increased dispersion stability and shelf-life.

Nonlimiting examples of dispersants include the polymers disclosed in U.S. Pat. Nos. 4,597,794; 5,085,698; 5,106,417; 5,272,201; and 5,281,261 (all incorporated by reference herein); a colloidal dispersion of polymers disclosed in U.S. Pat. No. 5,328,504 (incorporated by reference herein).

Humectant:

Formula (I) represents sulfonated polyethylene oxides useful as humectants in the present invention. The presence of these humectants extends decap time and helps control the drying rate for the inks. Preferred humectants have a Formula (I) where "a" ranges from 8–25, "b" and "c" are 0, "p" ranges from 1–5, and M is a sodium ion.

Humectants of Formula (I) can be prepared, for example, by the transesterification reaction of polyethylene oxides of Formula (III) and the sodium salt of dimethyl 5-sulfoisophthalate (DMSSIP) of Formula (IV) wherein a greater number of moles of (III) is present than moles of (IV):

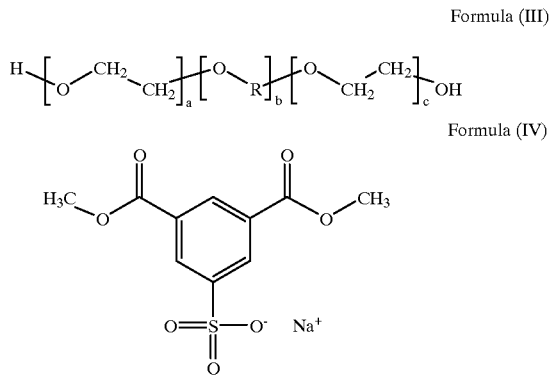

Formula (III)

Formula (IV)

Methanol is removed during the transesterification and the methyl esters of Formula (IV) become esters of polyethylene oxide of Formula (III). The reaction product is generally a mixture of sulfonated polyethylene oxides of Formula (I) with a range of values of "p" having some unreacted polyethylene oxide of Formula (III). Sulfonated polyethylene oxides represented by Formula (I) can be prepared according to the teachings of U.S Pat. Nos. 4,638,017; 4,738,992, the disclosures of which are incorporated by reference.

Polyethylene oxides of formula (III) can be prepared by initiating the polymerization of ethylene oxide with a diol: H—O—R—OH. If ethylene glycol is used (R=—CH2CH2—) the product is polyethylene oxide. Other diols useful for this purpose include for example 1,3-propanediol, 1,4-butanediol, 1,6-hexanediol, and polyether diols of molecular weight below about 1000 such as polypropylene oxide diols or polytetramethylene oxide diols.

Aqueous Medium:

In addition to the pigments, the dispersants, and the humectants described above, the inks will comprise primarily water as the aqueous medium which serves as a pigment suspension agent. In addition to water in the aqueous medium, other additives provide various properties.

For example, high boiling point water miscible organic cosolvents such as polyhydric alcohols, may also be employed to help to control the drying rate. Suitable high boiling cosolvents include, for example ethylene glycol, propylene glycol, butylene glycol, triethylene glycol, 1,2,6-hexanetriol, thiodiglycol, hexylene glycol, and diethylene glycol, trimethylolpropane, trimethylolethane, sorbitol; glycerol, and lower alkyl ethers such as ethylene glycol monomethyl or monoethyl ether, diethylene glycol methyl or ethyl ether, and triethylene glycol monomethyl or monoethyl ether. Alkylene glycols such as dietliylene glycol are the preferred polyhydric alcohols.

Other useful additives which will also help to control drying rate include urea and its derivatives, amides, hydroxyether derivatives such as butyl carbitol or cellusolve, amino alcohols, and other water soluble or water miscible materials, as well as mixtures thereof.

The polyols can comprise from about 5 to about 60 weight percent of the aqueous medium and preferably from about 8 to about 40 weight percent.

The presence of humectants of Formula (I) can permit a reduction in the overall amount of high boiling organic cosolvents added to an ink, without loss of decap time. This makes it possible to obtain faster drying rates in inks that also have long decap times.

Optional Additives:

Inks of the present invention can employ ionic and nonionic surfactants to improve wetting and to reduce the surface tension of the ink system. Nonlimiting examples of ionic surfactants include Aerosol OT surfactant (available from American Cyanamid of West Paterson, N.J.); and Darvan No. 1 and Darvan No. 7 surfactants (both available from T. T. Vanderbilt Co. of Norwalk, Conn.).

Nonlimiting examples of nonionic surfactants include Triton X-100, Triton X-102, Triton X-114, Triton X-101, and Triton CF-10 surfactants (all available from Union Carbide Corp.); Surfynol CT-136 (which is actually a mixture of anionic and nonionic surfactants), Surfynel 104, Surfynol 465, and Surfynol TG surfactants (all available from Air Products and Chemicals of Allentown, Pa.); and Tergitol NP-9 and Tergitol NP-10 surfactants (both available from Union Carbide Chemicals and Plastics Co. of Danbury, Conn.).

The surfactants can comprise from about 0.01 to about 6 weight percent of the aqueous medium and preferably from about 0.05 to about 4 weight percent.

Other ink additives commonly known in the art can also be used, including biocides, fungicides, defoamers, corrosion inhibitors, viscosity modifiers, pH buffers, penetrants, sequestering agents, and the like.

Ink Processing:

Current compounding technology for the processing of pigment dispersions employs numerous processing technologies. One such technology makes use of ultrasonic energy to achieve mixing and particle deflocculation. Another technology makes use of media mills, such as ball mills, sand mills or attritors. Media mills achieve acceptable pigment dispersions by subjecting the pigment mixture to high intensity inicroshearing and cascading which breaks down agglomerations of the pigment particles.

Homogenizers and emulsifiers can also be used for ink compounding. These systems generally function by forcing a premix of solids and liquids to collide against a surface, or to collide against itself.

The conventional two-roll mill and three-roll mill processing technologies can be effective techniques for dispersing pigment particles if the materials can be formulated into highly viscous paste for processing, then followed by a let-down step to produce the final ink.

In still another processing method, the pigment dispersion can be forced through a series of small nozzles having diameters on the order of about 150 micrometers to about 1000 micrometers. Such systems must be able to withstand very high pressures at high fluid velocities. Three different configurations for such systems may be used: a) a "wedge" configuration with orifices of decreasing diameter, b) a "wedge" configuration within which the orifices have cavitation enhancement devices, and c) an "impinging jet" configuration in which the dispersion stream is split into at least two elements, each stream is passed through an orifice to create a jet, and the jet streams are recombined by impinging them against each other. Each of these systems has been found to yield satisfactory results when processing water-based pigmented inks. Examples of these processes can be found in U.S. Pat. No. 5,482,077 (Serafin et al.), U.S. patent application Ser. Nos. 08/555,671 and 08/693,552 (both Serafin et al.), and PCT Patent Publications W096/14925 and W096/14941 (both Serafin et al.), all incorporated by reference herein.

After the ink has been processed, it is filtered using, for example, a 5 micrometer Whatman Polycap 36 HD cartridge type filter (available from Arbor Technology, Ann Arbor, Mich.). A pump, such as a Masterflex peristaltic pump (available from Barnant Co., Barrington, Ill.) can be used to feed the ink through the filter. A flow rate of about 120 milliliters per minute with a back pressure of about 3 psi (0.21 kg/cm$^2$ metric) is preferred.

Specific embodiments of the invention appear in the following examples.

EXAMPLES

Example 1

To a one liter flask was added 49.3 grams (0.333 equivalents) of diniethyl 5-sulfoisophthalate, sodium salt, and 400 grams (1.33 equivalents) of polyethylene oxide ("Carbowax 600", available from Union Carbide Corporation, molecular weight 600). The mixture was heated to 175° C. with agitation for one hour under vacuum. Atmospheric pressure was restored with nitrogen and 1.8 grams of zinc acetate was added. The reaction was then heated to 220° C. for 2 hours under a nitrogen atmosphere in an apparatus set up to condense and collect methanol. About 8 grams (0.26 moles) of methanol was collected. The reactor was then isolated from the condenser and a vacuum was induced. The reaction was cooled under vacuum from 220° C. to 175° C. over a period of one hour. The reaction was then cooled to 100° C., the vacuum was released, and the product was decanted. The resulting polyol has a calculated hydroxyl equivalent weight of 425.

Example 2

In a 250 ml 3 neck round bottom flask fitted with a water cooled distilling head, overhead mechanical stirrer, thermocouple, nitrogen inlet and heating mantle was charged 97.7 grams (0.326 equivalents) of polyethylene oxide ("Carbowax 600", 600 rnolecular weight), 32.1 grams (0.217 equivalents) DMSSIP, and 0.2 grams totrabutyl titanate. The reaction was degasred using full vacuum twice, breaking with nitrogen through the manifold. Nitrogen purge was maintained through the manifold during the reaction. The reaction was heated to 225° C. with distillation of methanol. After holding at 225° C. for 30 minutes, the reaction was cooled to 200° C. over a period of an hour. A vacuum was pulled on the reaction. After 30 minutes at 200° C., the reaction was cooled under vacuum over a period of 25 minutes to 170° C. Atmospheric pressure was reestablished with nitrogen. The product was a liquid having a calculated molecular weight of 2136, (hydroxyl equivalent weight of 1068).

Example 3

In a 250 ml 3 neck round bottom flask fitted with a water cooled distilling head, overhead mechanical stirrer, thermocouple, nitrogen inlet and heating mantle was charged the 80 grams (0.267 equivalents) of polyethylene oxide ("Carbowax 600", 600 molecular weight), 34.32 grams (0.232 equivalents) of DMSSIP, and 0.18 grams tetrabutyltitanate. The reaction was purged with nitrogen then degassed under vacuum breaking the vacuum with nitrogen. The reaction was heated to 160° C. and held for 30 minutes. The reaction was heated to 205° C. over a period of 2.5 hours and held there for a period of 6 hours. A vacuum was pulled on the reaction for 25 tinutes as it cooled to 175° C. The vacuum was released with nitrogen and the material was drained from the reactor. It had a calculated molecular weight of 5720 (hydroxyl equivalent weight of 2860).

Example 4

In a 1000 ml 3 neck round bottom flask fitted with a water cooled distilling head, overhead mechanical stirrer, thermocouple, nitrogen inlet and heating mantle was charged 190.9 grams (1.29 equivalents) DMSSIP, 273 4 grams (5.15 equivalents) diethylene glycol, and 0.2 grains tetrabutyl titanate. A vacuum was pulled on the reaction and released with nitrogen. The reaction was heated to 190° C. with distillation of methanol. The reaction was cooled to 160° C. and a vacuum was pulled for 30 minutes. A total of 51 grams of methanol containing some diethylene glycol was distilled from the reaction. The calculated molecular weight is 226 (113 grams/equivalent hydroxyl).

Example 5

Magenta Ink Dispersion Containing 20% Diethylene Glycol

A pigmented magenta ink was prepared according to the following procedure:

1. 218.4 grams of de-ionized water was weighed into a 16 oz. (456 ml) glass jar.
2. 7.5 grams of Poly-Tergent 2A1 (obtained from Olin Corp.,Norwalk, Conn., hereafter "Olin") was added to the water.
3. 54.6 grains of diethylene glycol (obtained from Sigma Chemical Co., St Louis, Mo., hereafter "Sigma")) was added to the aqueous mixture.
4. The mixture was mixed using gentle shaking until a homogeneous solution was obtained.
5. 10.5 grams of Bayer Quindo Magenta powder RV-6828 Pigment Red 122 (Bayer Corp., Rock Hill, S.C., hereafter "Bayer") was added to the solution.
6. The resulting mixture was treated with a model XL2020 Sonicator (made by Misonix Incorporated, Farmingdale, N.Y., hereafter "Misonix") for 30 seconds at a setting of 192 watts, 3 minutes at a setting of 137 watts, the for an additional 2.5 minutes at a setting of 192 watts.
7. The mixture was then forced through a series of small nozzles arranged in the "impinging jet" configuration as described above. It was processed for 15 minutes at a pressure of 22,000 psi. (1546.8 kg/cm$^2$metric)
8. The ink was filtered using a 5 micron Whatman Polycap 36 HD cartridge type filter (available from Barnant Co., Barrington, Ill.) was used to feed the ink through the filter.

The final ink was filled into a clean empty HP 51626A DeskJet cartridge (Hewlett Packard, Corvallis, Oreg.) and test printed using a NovaJet II printer (Encad Inc. of San Diego, Calif.). Continuous printing was carried out to print 34 inches (863.6 mm)×36 inches (914.4 mm) solid blocks onto 3M Scotchprint™ Opaque Ink Jet Film (Product No. 8502) until the cartridge was empty. The ink printed continuously without any problem to produce a uniform magenta image of excellent quality. No nozzle plugging was observed during the entire printing process, no banding was visible on the printed image, and the appearance of the color density remained the same from the beginning to the end of the solid printed blocks. The film with the printed solid image was overlaminated with 3M Luster Protective Finish 2 mil (0.05 mm) Vinyl Overlaminate (Product No. 8510). Color density was measured using a Gretag SPM50 Spectrophotometer (available from Gretag Aktiengesellschaft, Regensdorf/Zurich, Switzerland). As shown in Table-1, there is no decrease in color density from the beginning of the printed image (when the cartridge was nearly full) to the end of the image (when the cartridge was nearly empty).

The same ink was allowed to age at room temperature for about 9 months, then filled into a clean empty HP 51626A DeskJet cartridge and test printed using a NovaJet II printer as described above. Again, the aged ink printed continuously without any problem to produce a uniform magenta image of excellent quality. No nozzle plugging was observed during the entire printing process, no banding was visible on the printed image, and the appearance of the color density remained the same from the beginning to the end of the solid printed blocks. The film with the printed solid image was overlaminated with 3M Luster Protective Finish 2 mil (0.05 mm) Vinyl Overlaminate (Product No. 8510). Color density was measured using the same Gretag Spectrophotometer as described above. Again, there was no decrease in color density from the beginning of the printed image to the end of the image as shown in Table-1.

TABLE 1

FRESH VS. AGED MAGENTA INK: COLOR DENSITY AS A FUNCTION OF THE DISTANCE FROM THE BEGINNING OF THE PRINTED SOLID IMAGE (86.4 CM WIDE)

| Distance from beginning of solid block (cm) | Color Density Fresh Ink (Example 5) | Color Density Aged Ink (Example 5) |
| --- | --- | --- |
| 1–20 | 1.82 | 1.98 |
| 70–90 | 1.88 | 1.96 |
| 92–112 | 1.89 | 1.97 |
| 160–180 | 1.90 | 1.98 |

Table-1 also shows that the magenta ink which had been aged for about 9 months produced essentially the same color density as that produced by the same ink when it was freshly made. This indicates that the magenta ink formulated with the dispersant described in this invention has good dispersion stability. A flocculated ink would also be expected to cause jetting problems such as kogation, nozzle plugging, which would be manifested in image defects such as banding, decrease in color density with printing time, etc. None of these problems were encountered during the entire printing test of thie aged magenta ink described in this example. The slightly higher color density printed with the aged ink (Table-1) in comparison with the color density printed with the fresh ink could probably be attributed to possible slight variation in nozzle sizes between the two different cartridges, or other factors such as slight variation in receptor coating thickness, difference in environmental conditions at the time of printing such as humidity and temperature.

All the above test results indicate that the magenta ink formulated with the dispersant described in this invention has good dispersion stability.

Example 6 (Control #1) and Example 7

The following ingredients were combined and mixed with a spatula until a homogenous paste was formed:
150.0 grams of diethylene glycol (Aldrich Chemical Co.)
67.5 grams of Poly-Tergent 2A1 (Olin Corp.)
150.0 grams of Bayer Quindo Magenta RV-6828 Pigment Red 122 (Bayer Corp.)
The paste was passed through a laboratory 3-roll mill (made by The J. H. Day Company, Cincinnati, Ohio) five times at moderate pressure to disperse the pigment.

Two inks were made from the above paste according to the following procedure:

Example 6 (Control #1)

Magenta Ink Containing 14% Diethylene Glycol and Polyethylene Oxide

The following ingredients were combined:
6.0 grams of Polyethylene Oxide ("Carbowax 600", molecular weight 600))
8.0 grams of trimethylolpropane (obtained from Aldrich Chemical Co.)
6.0 grams of urea (obtained from Aldrich Chemical Co.)
18.6 grams of diethylene glycol (obtained from Sigma Chemical Co.)
147.2 grams of de-ionized water The mixture was mixed using gentle shaking until a homogeneous solution was obtained. To this solution, 13.23 grams of the paste (prepared by using the 3-roll mill method described above) was added and dispersed using an air-driven blade mixer at moderate speed for about 20 minutes to make a magenta ink (Control #1). The pH of the ink was adjusted to 8.5 with the addition of 1 N NaOH solution.

Example 7

Magenta Ink Containing 14% Diethylene Glycol and Sulfonated Polyethylene Oxide

A magenta ink was prepared exactly the same way as described in Example 6 (Control #1) with the exception that, instead of Carbowax Polyethylene Oxide 600, 6.0 grams of sulfonated polyethylene oxide (molecular weight of PEO= 600) (synthesized according to the procedure described in Example 1) was used.

About 40 grams of each ink was used to fill into a clean empty HP51626A DeskJet cartridge for "idle time to start-up ability" test. The procedure for this test is described as follows. A NovaJet III printer was loaded with a cartridge which was filled with one of the above magenta inks. The prime test was run to ensure all nozzles were firing. Then a solid block of 3 inches(76.2 mm)×34 inches(863.6 mm) was printed. A second prime test was carried to ensure all nozzles were firing. The printer was then left to sit idle for various time intervals. After each idle time a prime test was run to evaluate each nozzle for its ability to start.

The results of this test were as follows:

| Magenta Ink | Idle Time (hours) | Number of Non-firing Nozzles |
| --- | --- | --- |
| Example 6(Control #1) | 15 | 0 |
|  | 64 | 24 |
| Example 7 | 15 | 0 |
|  | 64 | 0 |

These results establish that the ink composition of this invention is superior to that using a prior art humectant in its resistance to nozzle clogging.

Additional test of Example 7 magenta ink was carried out as follows: About 100 grams of Example 7 magenta ink was poured into a 4 oz. (114 ml) glass jar and sealed with a cover. The ink was then stored in an oven set at a constant temperature of 140° F. (60° C.) for 128 hours. After the ink was removed from the oven and allowed to cool to room temperature, it was filled into a clean empty HP51626A DeskJet cartridge and test printed using a NovaJet III printer. Continuous printing was carried out to print 34 inches(863.6 mm)×36 inches (914.4 mm) solid blocks onto 3M Scotchprint™ Opaque Imaging Media (Product No. 3657-10) until the cartridge was empty. The ink printed continuously without any problem to produce a uniform magenta image of excellent quality. No nozzle plugging was observed during the entire printing process, no banding was visible on the printed image, and the appearance of the color density remained the same from the beginning to the end of the solid printed blocks. This again indicates that the magenta ink formulated with the dispersant described in this invention has good dispersion stability.

Example 8(Control #2), Example 9(Control #3), and Example 10

Cyan Ink Containing 20% Diethylene Glycol and Additional Diethylene Glycol, Polyethylene Oxide, or Sulfonated Polyethylene Oxide Two bottles of cyan stock dispersion were prepared the same way according to the following procedure:

1. 40.0 grams of diethylene glycol (obtained from Aldrich Chemical Co.) was weighed into an 8 oz. (228 ml) glass jar.
2. 152.0 grams of de-ionized water was added to the diethylene glycol.
3. 2.4 grams of Poly-Tergent 2A1 (obtained from Olin Corp.) was added to the mixture.
4. The mixture was mixed using gentle shaking until a homogeneous solution was obtained.
5. 5.67 grams of Sunfast Blue 15:3 powder (obtained from Sun Chemical Corp., Cincinnati, Ohio) was added to the solution.
6. The pigment was dispersed by using a model XL2020 Sonicator for a total of 8 minutes at a setting of 192 watts.
7. The pH of the dispersion was adjusted to 9.2 with the addition, dropwise, of 1 N NaOH solution.
8. The dispersion was allowed to stand on a laboratory bench top for about 30 hours for the large particles to settle to the bottom of the glass jar. Then the large particles were separated from the final ink by carefully transferring the top portion of the dispersion to a clean empty glass jar.

Three cyan inks were prepared from the above cyan stock dispersion by adding diethylene glycol (Sigma Chemical Co.), polyethylene oxide 600 (Carbowax 600 from Union Carbide), and sulfonated polyethylene oxide (molecular weight of PEO=600) (synthesized according to the procedure described in Example 4), respectively as follows:

| Grams of Ingredient | Example 8 (Control #2) | Example 9 (Control #3) | Example 10 |
|---|---|---|---|
| Cyan Stock Dispersion | 95.0 | 95.0 | 95.0 |
| Diethylene Glycol | 5.0 | 0 | 0 |
| Carbowax 600 | 0 | 5.0 | 0 |
| sulfonated PEO-600 from Example 1 | 0 | 0 | 5.0 |

Each ink was mixed by gentle shaking followed by treatment with a model XL2020 Sonicator for 1 minute at a setting of 110 watts.

About 40 grams of each ink was used to fill into a clean empty HP 51626A DeskJet cartridge for "idle time to start-up ability" test as described previously.

The results of this test were as follows:

| Cyan Ink | Idle Time (hours) | Number of Non-firing Nozzles |
|---|---|---|
| Example 8(Control#2) | 15 | 14 |
| Example 9(Control#3) | 15 | 21 |
| Example 10 | 15 | 0 |

These results clearly establish that the ink composition of the invention is superior to that using a prior art humectant in its resistance to nozzle clogging.

Additional test of Example 10 cyan ink was carried out as follows: The remainder of the ink (about 60 grams) was poured into a 4 oz. (114 ml) glass jar, sealed with a cover and stored in an oven set at a constant temperature of 140° F. (60° C.) for 415 hours (about 17 days). After the ink was removed from the oven and allowed to cool to room temperature, it was filled into an empty HP51626A DeskJet cartridge and test printed using a NovaJet III printer. Continuous printing was carried out to print 34 inches(863.6 mm)×36 inches (914.4 mm) solid blocks onto 3M Scotchprint™ Opaque Imaging Media (Product No. 3657-10) until the cartridge was empty. The ink printed continuously without any problem to produce a uniform cyan image of excellent quality. No nozzle plugging was observed during the entire printing process, no banding was visible on the printed image, and the appearance of the color density remained the same from the beginning to the end of the solid printed blocks. This again indicated that the cyan ink formulated with the humectant described in this invention has excellent performance and solves the problems in the art.

The invention is not limited to these embodiments. The claims follow.

What is claimed is:

1. An inkjet ink, comprising:

(a) an aqueous medium, (b) a pigment, (c) an anionic dispersant, and (d) a humectant;

wherein the dispersant is all alkyl(sulfophenoxy) benzenesulfonic acid or salt of formula (II):

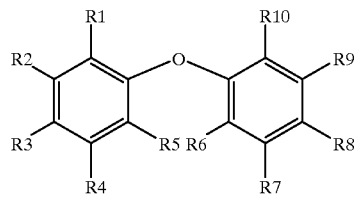

Formula (II)

wherein one member of the group R1, R2, R3, R4, and R5 is either a sulfonic acid group or its salt;

wherein one member of the group R6, R7, R8, R9, and R10 is either a sulfonic acid group or its salt;

wherein one or more members of the group R1, R2, R3, R4, R5, R6, R7, R8, R9, and R10 is an alkyl group having from about 4 to about 20 carbon atoms; and wherein the remaining members of the group R1, R2, R3, R4, R5, R6, R7, R8, R9 and R10 are hydrogen atoms;

wherein the anionic dispersant adheres to a surface of a particle of the pigment and wherein the pigment particles become negatively charged.

2. The ink according to claim 1, further comprising additives selected from the group consisting of surfactants, biocides, fungicides, defoamers, corrosion inhibitors, viscosity modifiers, pH buffers, penetrants, sequestering agents, and combinations thereof.

3. The ink according to claim 1, wherein the sulfonic acid salt is $SO_3^-M$, where M is selected from the group of hydrogen ion, alkali metal ions and ammonium salts $NR_4^+$ wherein R is H, alkyl, aralkyl, or aryl).

* * * * *